United States Patent
Liu et al.

(10) Patent No.: US 8,575,965 B2
(45) Date of Patent: Nov. 5, 2013

(54) INTERNAL CLOCK GATING APPARATUS

(75) Inventors: Chi-Lin Liu, Yonghe (TW);
Chung-Cheng Chou, Hsin-Chu (TW);
Yangsyu Lin, New Taipei (TW); Hsiao Wen Lu, Guishan Township (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 27 days.

(21) Appl. No.: 13/118,060

(22) Filed: May 27, 2011

(65) Prior Publication Data
US 2012/0299622 A1     Nov. 29, 2012

(51) Int. Cl.
*H03K 19/096*     (2006.01)
(52) U.S. Cl.
USPC ................................. 326/98; 326/93
(58) Field of Classification Search
USPC ............. 326/37–41, 47, 93–98; 327/200–218
See application file for complete search history.

(56) References Cited

U.S. PATENT DOCUMENTS

| | | | |
|---|---|---|---|
| 7,365,575 B2* | 4/2008 | Kim | 326/95 |
| 2010/0308864 A1* | 12/2010 | Lee et al. | 326/46 |
| 2010/0315126 A1* | 12/2010 | Kim | 326/98 |

\* cited by examiner

*Primary Examiner* — Jany Richardson
(74) *Attorney, Agent, or Firm* — Slater & Matsil, L.L.P.

(57) ABSTRACT

An internal clock gating apparatus comprises a static logic block and a domino logic block. The static logic block is configured to receive a clock signal and a clock enable signal. The domino logic block is configured to receive the clock signal and a control signal from an output of the static logic block. The static logic block and the domino logic block are further configured such that an output of the domino logic block generates a signal similar to the clock signal in phase when the clock enable signal has a logic high state. On the other hand, the output of the domino logic block generates a logic low signal when the clock enable signal has a logic low state. Furthermore, the static logic block and the domino logic block can reduce the setup time and delay time of the internal clock gating apparatus respectively.

21 Claims, 9 Drawing Sheets

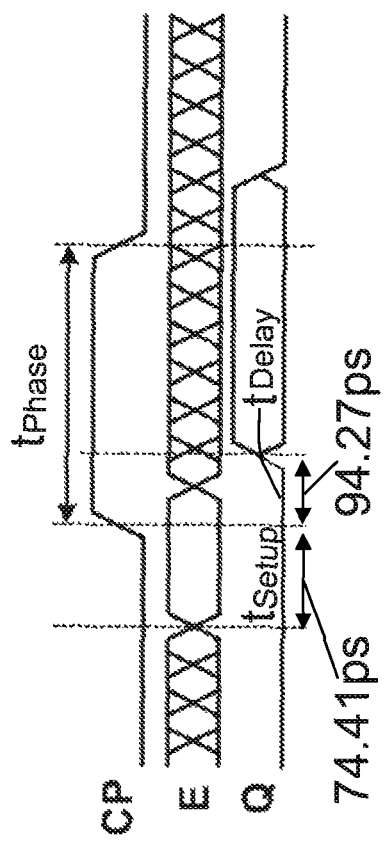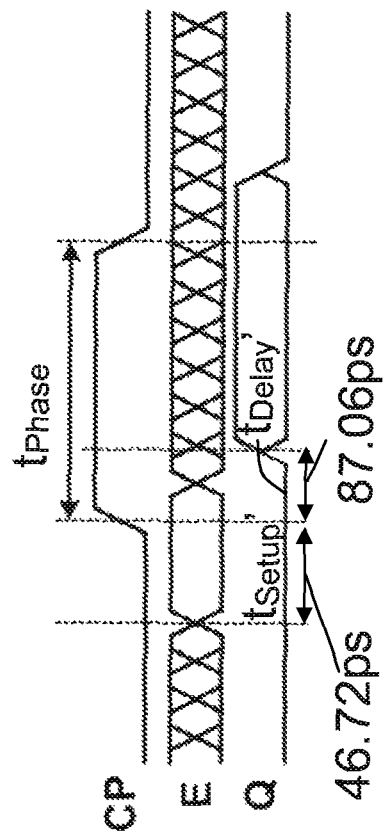
Figure 4B
Figure 4C

INTERNAL CLOCK GATING APPARATUS

BACKGROUND

A variety of battery powered portable devices, such as mobile phones, notebook computers and the like, have become popular. Each portable device may employ a plurality of integrated circuits. In order to extend the battery life of portable devices, power dissipation of integrated circuits has become a major concern. Various power saving solutions have been adopted to improve the power dissipation of a portable device. Among them, reducing clock network power dissipation is an effective way to reduce the total power consumption in modern portable devices comprising a plurality of high performance digital systems.

A digital system may comprise various synchronous circuits, which need a clock to synchronize all parts together. As semiconductor technologies further advance, the frequency of clock signals increases as well. As a result, the power consumption of the clock network increases accordingly. Internal clock gating is an effective technique to reduce the total clock network power dissipation of a battery powered digital system. More particularly, the internal clock gating technique disables the clock of some circuits of the digital system when they are not in use during some particular clock cycles. By shutting down the clock of inactive circuits, the internal clock gating technique can prevent the inactive circuits from consuming unnecessary power so as to extend the battery life of a battery powered digital system.

Internal clock gating may be implemented by employing at least a latch such as a positive edge triggered D type flip-flop. However, a latch circuit may result in two types of delays, namely propagation delay and setup and hold time delay. The propagation delay of digital circuits is defined as the amount of time between a change in an input and a change on the output. The change is specified as a 50% point on the input signal to a 50% point on the output signal. The propagation delay is related to the switching time of transistors within a logic gate. In a latch circuit, the major delay source is a CP-to-Q delay, which is defined as the amount of delay time between the change of the clock signal of the latch and the corresponding change in the output signal Q.

On the other hand, the setup time is defined as a minimum period in which a data signal is held steady before the leading edge of a clock signal is applied to the D type flip-flop. A valid and constant data signal during such a period can prevent the flip-flop from entering a metastable state in which the output of the D type flip-flop is not predictable. Furthermore, the output of the D type flip-flop may oscillate between a logic low state and a logic high state. Likewise, the hold time is defined as a period after the leading edge of the clock signal. Similarly, during the specified hold time, the data signal must be kept valid and constant so that the flip-flop can generate a valid output. The setup and hold time of synchronous circuits may vary based upon different semiconductor processes. A typical setup and hold time may be less than one hundred picoseconds.

As modern computing power advances and core processors may operate in the order of GHz, the delay time from internal clock gating may have a negative impact on the performance of core processor units. Furthermore, the long delay time may prevent a core processor unit from achieving high performance by further increasing its operating frequency. Moreover, at a high operating frequency, in order to reduce the total power dissipation, reducing the unnecessary power losses by employing internal clock gating is a necessary step to extend battery life.

BRIEF DESCRIPTION OF THE DRAWINGS

For a more complete understanding of the present invention, and the advantages thereof, reference is now made to the following descriptions taken in conjunction with the accompanying drawings, in which:

FIGS. 4A-4C illustrate an advantage of forming an internal clock gating apparatus by employing a static logic block and a domino logic block;

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, an internal clock gating apparatus comprising a domino logic block and a static logic block. The invention may also be applied, however, to a variety of clock gating circuits.

Figure 1:
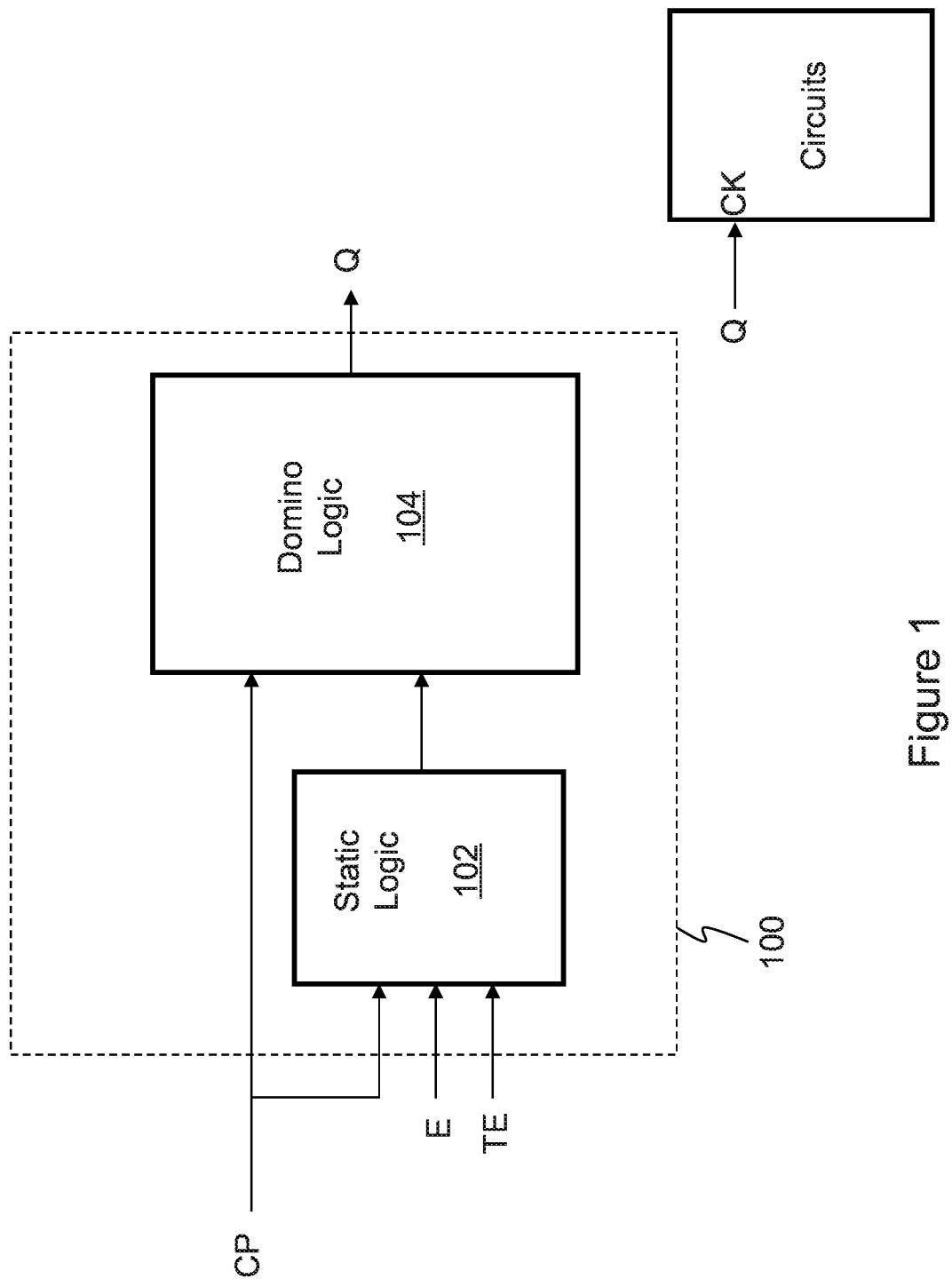
FIG. 1 illustrates a block diagram of an internal clock gating apparatus in accordance with an embodiment.

Referring initially to FIG. 1, a block diagram of an internal clock gating apparatus is illustrated in accordance with an embodiment. The internal clock gating apparatus 100 comprises a static logic block 102 and a domino logic block 104. The domino logic block 104 comprises a first input coupled to a clock signal CP and a second input coupled to an output of the static logic block 102. The static logic block 102 has a first input coupled to the clock signal CP, a second input coupled to a clock enable signal E and a third input coupled to a test enable signal TE. It should be noted that when the test enable signal TE is set to a logic high state, the internal clock gating apparatus 100 may perform a scan test. On the other hand, when the test enable signal TE is set to a logic low state, the internal clock gating apparatus 100 operates in a normal mode.

When the internal clock gating apparatus 100 is operating in a normal mode, in response to the status of the clock enable signal E, the domino logic block 104 may provide a clock signal for various synchronous circuits coupled to the output Q of the domino logic block 104. In contrast, when the synchronous circuits coupled to the output Q of the domino logic block 104 are inactive, the clock enable signal E may change its status and disable the clock signal at the output Q of the domino logic block 104. The detailed operation principle for the static logic block and the domino logic block will be described below with respect to FIG. 2 and FIG. 3.

Figure 2:
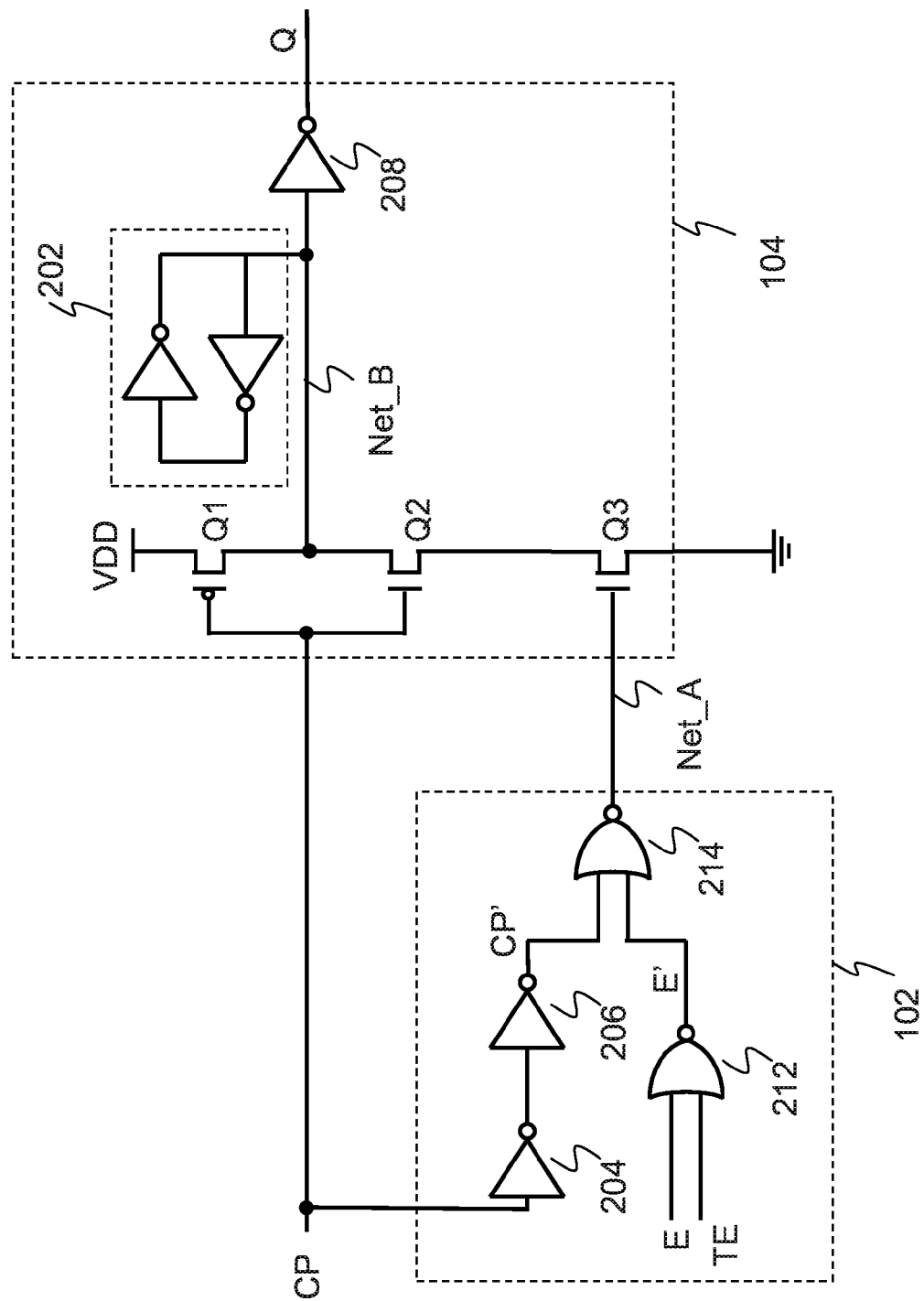
FIG. 2 illustrates in detail a schematic diagram of the internal clock gating apparatus shown in FIG. 1.

FIG. 2 illustrates in detail a schematic diagram of the internal clock gating apparatus shown in FIG. 1. In accordance with an embodiment, the static logic block 102 may comprise a first inverter 204, a second inverter 206, a first NOR gate 212 and a second NOR gate 214. The first inverter 204 and the second inverter 206 are connected in cascade having an input coupled to the clock signal CP. As shown in FIG. 2, the circuit formed by the first inverter 204 and the second inverter 206 is equivalent to a buffer, and thus the signal at the output of the second inverter 206 is identical to the clock signal CP but shifted in time due to the propagation delay derived from the first inverter 204 and the second inverter 206. Throughout the description, the signal at the output of the second inverter 206 is alternatively referred to as CP'.

The first NOR gate 212 has two inputs coupled to the clock control signal E and the test control signal TE respectively. The output of the first NOR gate 212 is coupled to one input of the second NOR gate 214. The other input terminal of the second NOR gate 214 is coupled to the output of the second inverter 206. In a normal operation mode (TE is low), according to the operation principle of a NOR gate, when the clock control signal E is high, the output of the first NOR gate 212 (referred to as E') is low. That is, the second input terminal of the second NOR gate 214 is low. The detailed operation of the static logic block 102 will be described below with respect to FIG. 3.

The domino logic block 104 comprises a first PMOS transistor Q1, a first NMOS transistor Q2, a second NMOS transistor Q3, a third inverter 208 and a full keeper block 202. The first PMOS transistor Q1, the first NMOS transistor Q2 and the second NMOS transistor Q3 are connected in series. More particularly, the first PMOS transistor Q1 has a source coupled to a voltage potential VDD, a drain coupled to a drain of the first NMOS transistor Q2, a gate connected to a gate of the first NMOS transistor Q2 and further coupled to the clock signal CP. The source of the first NMOS transistor Q2 is coupled to the drain of the second NMOS transistor Q3. The second NMOS transistor Q3 has a source connected to ground. In addition, the output signal Net_A from the static logic block 102 is coupled to the gate of the second NMOS transistor Q3. The junction point between the first PMOS transistor Q1 and the first NMOS transistor Q2 is a signal bus, which is referred to as Net_B. The bus Net_B is coupled to the output Q of the domino logic block 104 via the third buffer 208. The full keeper block 202 is attached at the bus Net_B. As shown in FIG. 2, two back-to-back connected inverters form the full keeper block 202. The full keeper block 202 is capable of holding the last valid logic value on the bus Net_B when both the first PMOS transistor Q1 and the second NMOS transistor Q3 are turned off and the bus Net_B starts to float. The detailed operation principle of the full keeper block 202 will be described below with respect to FIG. 3.

Figure 3:
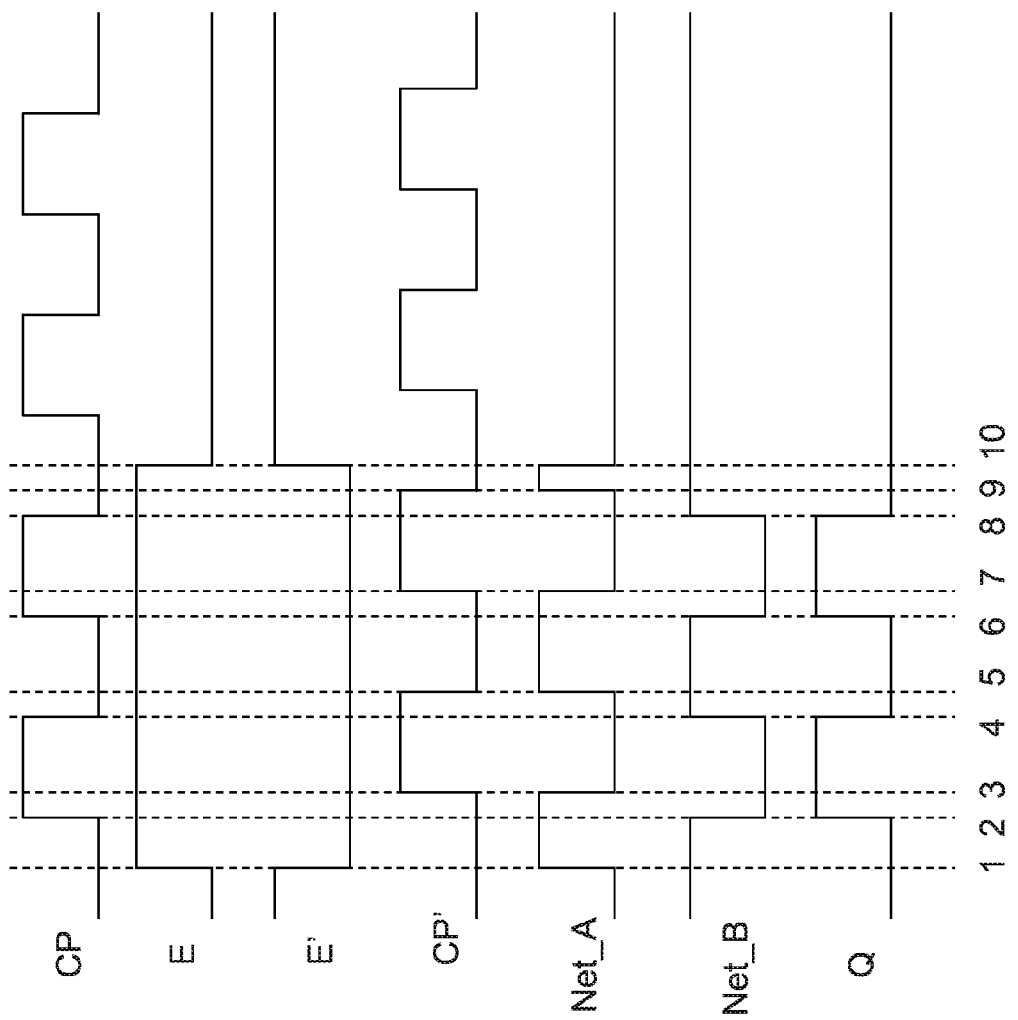
FIG. 3 depicts a timing diagram illustrating the operation principle of the internal clock gating apparatus shown in FIG. 2.

FIG. 3 depicts a timing diagram illustrating the operation principle of the internal clock gating apparatus shown in FIG. 2. As described above with respect to FIG. 2, the internal clock gating apparatus 100 may comprise various logic gates. Based upon the circuit shown in FIG. 2, the timing diagram illustrates in detail how the logic gates in FIG. 2 respond to input signals in relation to time. As shown in FIG. 3, there may be four clock cycles. Assume that the clock enable signal E has a logic high state during the first two cycles of the clock signal CP and has a logic low state during the last two cycles of the clock signal CP. In accordance with the operation of the internal clock gating apparatus 100, the clock signal CP is forwarded from an input to an output of the internal clock gating apparatus 100 when the clock enable signal E has a logic high state. On the other hand, the clock signal CP is disabled and the output of the internal clock gating apparatus 100 remains low when the clock enable signal E has a logic low state. The feature of the internal clock gating apparatus 100 may be used to reduce clock network power dissipation. For example, in a digital system, a system power management unit (not shown) may set the clock enable signal E as low when the digital system detects the circuits coupled to the clock signal are inactive. In response to the logic low at the clock enable signal E, the internal clock gating apparatus 100 may disable the clock signal CP accordingly. In sum, an advantageous feature of having an internal clock gating apparatus is that a digital system may disable the clock signals of some inactive circuits so that the total power consumption may be reduced.

In FIG. 3, assume that both the clock signal CP and the clock enable signal E are at an initial value of "0". At the first time instance (dashed line labeled 1), the leading edge of the clock enable signal E occurs. As a result, the output E' of the first NOR gate 212 (not shown but illustrated in FIG. 2) changes from a logic high state to a logic low state. CP' remains low because it is identical to CP in phase but with a time delay. In response to the logic low state at CP' and the logic low state at E', the second NOR gate 214 (shown in FIG. 2) generates a logic high state at the bus Net_A. The domino logic block 104 (shown in FIG. 2) receives a logic high signal at the bus Net_A and a logic low at the clock signal CP. As shown in FIG. 2, the logic low at CP turns on the first PMOS transistor Q1. At the same time, the logic low at CP turns off the first NMOS transistor Q2. As a result, the bus Net_B is at a logic high state because the bus Net_B is coupled to the voltage potential VDD through the turned-on PMOS transistor Q1. Furthermore, the output Q of the internal clock gating apparatus 100 generates a logic low signal in response to the logic high at the bus Net_B.

At the second time instance (dashed line labeled 2), the leading edge of the clock signal CP occurs. CP' remains low because the buffer formed by the first inverter 204 and the second inverter 206 results in a delay between the leading edge of CP and the leading edge of CP'. As a result, the bus Net_A remains high until the third time instance (dashed line labeled 3) wherein the leading edge of CP' occurs. During the period between the second time instance and the third time instance, the logic high at the bus Net_A and the logic high at CP lead to a logic state change at the bus Net_B. In particular, the logic high at the bus Net_A turns on the second NMOS Q3 and the logic high at CP turns on the first NMOS Q2. The turned-on Q2 and Q3 cause the bus Net_B to be connected to ground so that the bus Net_B is pulled down to a logic low state. In response to the change at the bus Net_B, the output of the internal clock gating apparatus 100 generates a logic high signal during the period between the second time instance and the third time instance.

At the third time instance, the leading edge of CP' occurs. As a result, the output Net_A of the second NOR gate 214 changes from a logic high state to a logic low state. During the period between the third time instance and the fourth time instance (dashed line labeled 4), the bus Net_B may be floating because both the first PMOS transistor Q1 and the second NMOS transistor Q3 are off in response to the logic high at CP and the logic low at the bus Net_A. As described above with respect to FIG. 2, when the bus Net_B starts to be floating, the full keeper 202 may hold the last valid logic level of the bus Net_B. Therefore, the bus Net_B remains its last valid logic level at the third time instance. As shown in FIG. 3, the last valid logic level at the third time instance is a logic low state. As a result, the bus Net_B remains low until the fourth time instance.

At the fourth time instance, the clock signal CP changes from logic high to logic low. The logic low at CP turns on the first PMOS transistor Q1. As a result, the bus Net_B is pulled up to a logic high state again. Consequently, the internal clock gating apparatus 100 generates a logic low state at its output Q in response to the logic state change at the bus Net_B. Due to the delay, the signal CP' remains high until the fifth time instance (dashed line labeled 5). In response to the falling edge of CP' at the fifth time instance, the bus Net_A changes from a logic low state to a logic high state. As a consequence, the second NMOS transistor Q3 is turned on. The turn-on of Q3 has no impact on the logic status of the bus Net_B because the first NMOS transistor Q2 is still off. The output Q of the internal clock gating apparatus 100 remains low until the sixth time instance (dashed line labeled 6). As shown in FIG. 3, the timing diagram during the period from the sixth time instance to the ninth time instance (dashed line labeled 9) is the same as that during the period from the second time instance to the fifth time instance, and thus is not discussed herein.

From the tenth time instance (dashed line labeled 10) shown in FIG. 3, the clock enable signal E changes from a logic high state to a logic low state. As a result, the output E' of the first NOR gate 212 changes to a logic high state. In response to the logic high at E', the second NOR gate 214 may generate a logic low signal at the bus Net_A. That is, the second NMOS transistor Q3 remains off when the clock enable signal E is at a logic low state. Since Q3 is off, the bus Net_B can be either pulled up by the turn-on of Q1 or floating when Q1 is off. When the bus Net_B is floating, the full keeper 202 may hold the last valid logic state of the bus Net_B. In the present example, as shown in FIG. 3, the last valid logic state at the bus Net_B is logic high. In sum, when the clock enable signal E is low, the bus Net_B remains high because either the turn-on of Q1 or full keeper 202 can pull up the bus Net_B to a logic high state. The logic high at the bus Net_B leads to a logic low at the output Q of the internal clock gating apparatus 100. As shown by the example timing diagram in FIG. 3, an advantageous feature of having an internal clock gating apparatus 100 is that unnecessary clock signals are blocked when a clock enable signal is low. Furthermore, a full keeper 202 can prevent logic buses such as the bus Net_B from floating so that the internal clock gating apparatus 100 can generate a reliable signal.

Figure 4A:
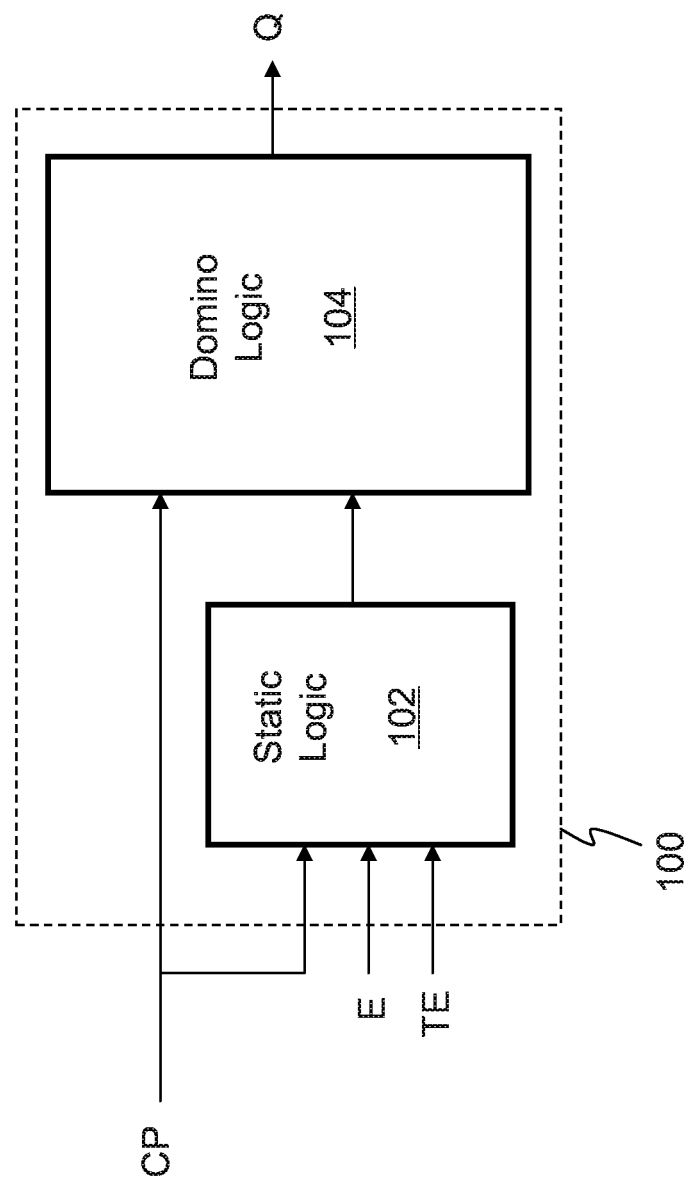

FIGS. 4A-4C illustrate an advantage of forming an internal clock gating apparatus by employing a static logic block and a domino logic block. As known in the art, the longer setup time and delay time of an internal clock gating apparatus may have a negative impact on the performance of a digital system. For example, when a digital system is operating in a GHz range, a delay such as one hundred picoseconds may trigger a malfunction of the digital system. FIG. 4A shows the internal clock gating apparatus formed by a static logic block 102 and a domino logic block 104. In comparison with a clock gating device formed by a latch circuit, the static logic block can reduce the setup time resulting from the operation of a latch circuit.

On the other hand, the domino logic circuit can further reduce the propagation delay from the clock signal CP to the output of the internal clock gating apparatus 100. FIG. 4B illustrates an example timing diagram of an internal clock gating apparatus based upon a conventional technique. As illustrated in FIG. 4B, the setup time is about 74.41 picoseconds and the delay time is about 94.27 picoseconds. Based upon the same operating environment, FIG. 4C shows that the setup time and delay time are 46.72 picoseconds and 87.06 picoseconds respectively after replacing the conventional internal clock gating apparatus with the internal clock gating apparatus comprising a static logic block and a domino logic block. In sum, an advantageous feature of having an internal clock gating apparatus 100 is that both the setup time and the delay time from an internal clock gating apparatus can be reduced so that the clock gating apparatus is applicable to high frequency applications.

Figure 5:
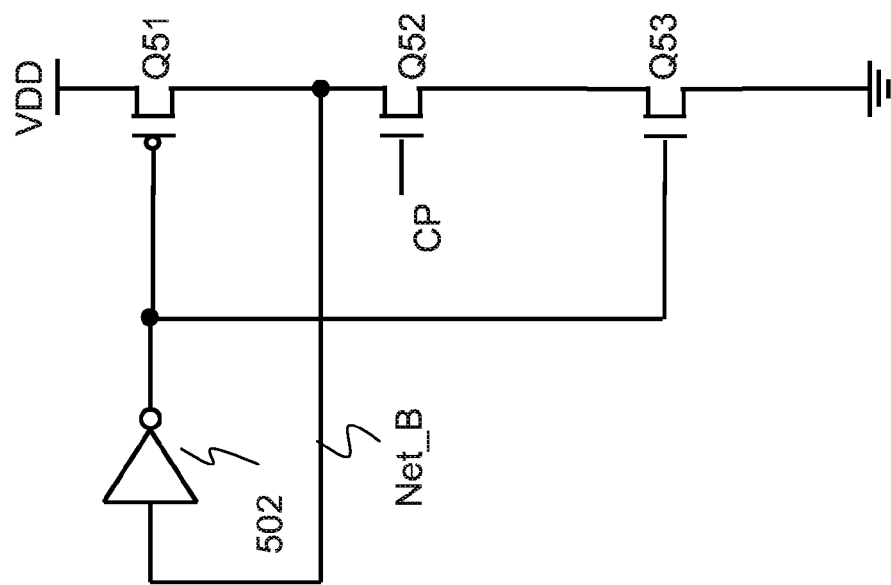
FIG. 5 illustrates a second example embodiment of a full keeper in accordance with another embodiment.

FIG. 5 illustrates a second example embodiment of a full keeper in accordance with another embodiment. The second example embodiment of a full keeper comprises a first inverter and three transistors connected in series. The first inverter 502 is similar to that of the full keeper 202 described with respect to FIG. 2 and will not be described herein to avoid repetition. As known in the art, the full keeper is used to hold the last valid logic value when a logic bus is floating. As shown in the timing diagram of FIG. 3 (e.g., the period between the third time instance and the fourth time instance), the clock signal CP has a logic high state when the bus Net_B is floating. As a result, the first NMOS transistor Q52 is turned on in response to the logic high at CP. The turn-on of the first NMOS transistor Q52 causes the first PMOS transistor Q51 to be connected to the second NMOS transistor Q53 so as to form a second inverter. Therefore, the circuit configuration of FIG. 5 is equivalent to the two back-to-back connected inverters of the full keeper 202 shown in FIG. 2.

Figure 6:
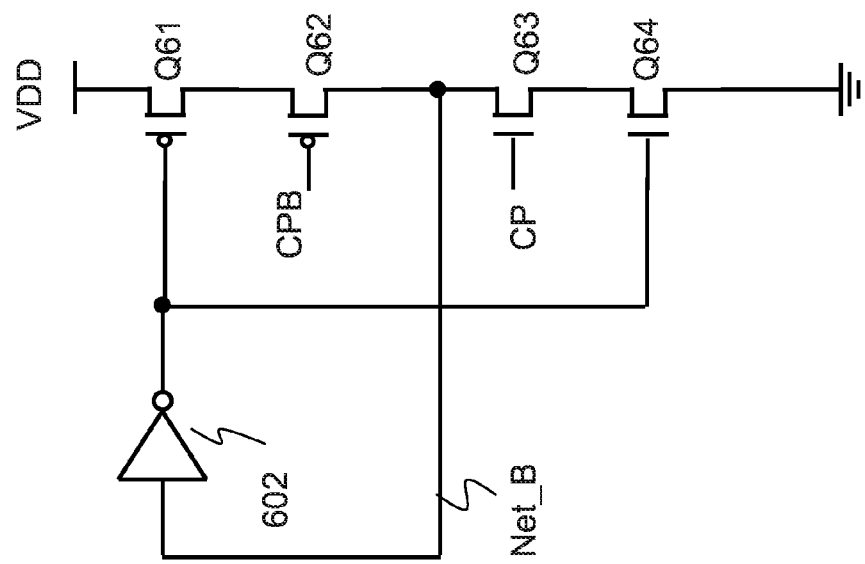
FIG. 6 illustrates a schematic diagram of a third example embodiment of a full keeper.

FIG. 6 illustrates a third example embodiment of a full keeper. The third example embodiment comprises a first inverter and four transistors connected in series. The first inverter 602 is similar to that of the full keeper 202 described with respect to FIG. 2 and will not be described herein to avoid repetition. As described in the previous paragraph, the full keeper is used to hold the last valid logic value when a logic bus is floating the clock signal CP has a logic high state when the bus Net_B is floating. Furthermore, CPB is defined as the inverse of the clock signal CP. As a result, the first NMOS transistor Q63 is turned on in response to the logic high at CP and the second PMOS transistor Q62 is turned on in response to the logic low at CPB. The turn-on of the second PMOS transistor Q62 and the first NMOS transistor Q63 causes the first PMOS transistor Q61 to be connected to the second NMOS transistor Q64 so as to form a second inverter. Therefore, when the bus Net_B is floating, the circuit configuration of FIG. 6 is equivalent to the two back-to-back connected inverters of the full keeper 202 shown in FIG. 2.

Figure 7:
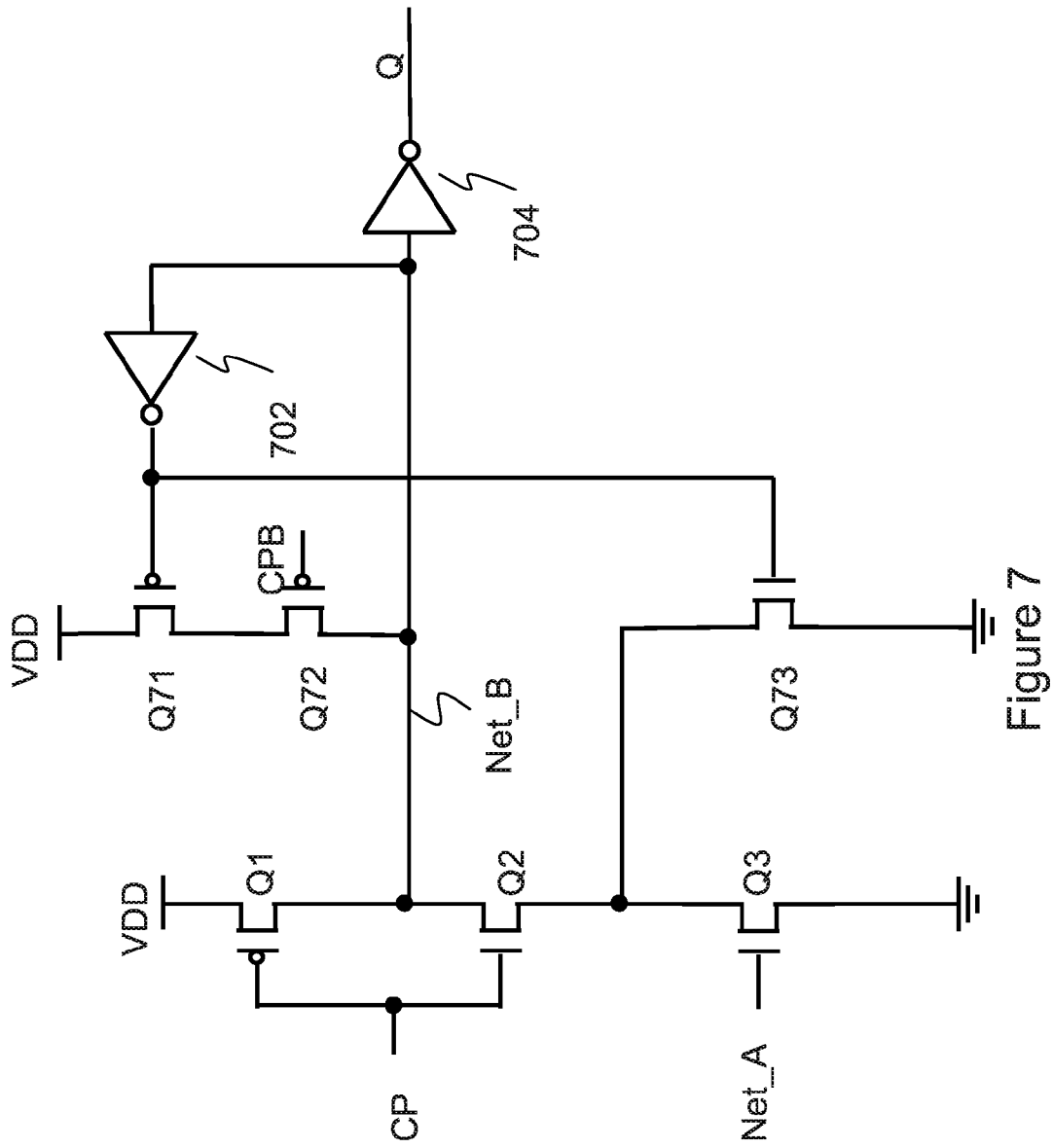
FIG. 7 illustrates a schematic diagram of a domino logic block comprising the full keeper shown in FIG. 6.

FIG. 7 illustrates a schematic diagram of a domino logic block comprising the full keeper shown in FIG. 6. In comparison with the full keeper 202 shown in FIG. 2, the full keeper shown in FIG. 7 comprises four transistors, namely the second PMOS transistor Q71, the third PMOS transistor Q72, the first NMOS transistor Q2 and the third NMOS transistor Q73. These four transistors form a second inverter when the bus Net_B is floating. More particularly, when the bus Net_B starts to be floating, CP is at a logic high value and CPB is at a logic low value. As a result, both the third PMOS transistor Q72 and the first NMOS transistor Q2 are turned on. As a consequence, the second PMOS transistor Q71 and the third NMOS transistor Q73 form a second inverter having an input coupled to the output of the first inverter 702 and an output coupled to the bus Net_B. The first inverter 702 receives the last valid logic value of the bus Net_B through its input and forwards the inverted Net_B to the second inverter formed by the second PMOS transistor Q71 and the third NMOS transistor Q73. The output of the second inverter generates an identical signal as the last valid logic value of the bus Net_B so as to prevent the bus Net_B from floating.

Figure 8:
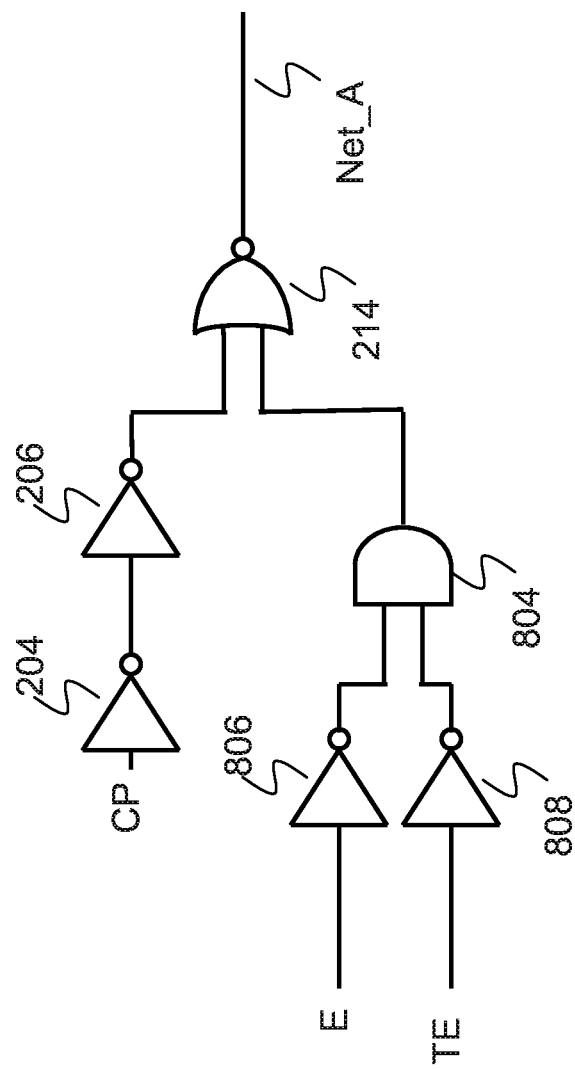
FIG. 8 illustrates a schematic diagram of a second example embodiment of a static logic block.

FIG. 8 illustrates a second example embodiment of a static logic block. In comparison to the first example embodiment of the static logic block 102 shown in FIG. 2, the second example embodiment employs a first NOR gate formed by a first inverter 806, a second inverter 808 and an AND gate 804. As known in the art, a NOR gate can be replaced with an AND gate and two inverters. Therefore, the circuit formed by the first inverter 806, the second inverter 808 and the AND gate 804 is equivalent to the first NOR gate 212 shown in FIG. 2. The operation principle of the first NOR gate 212 has been discussed with respect to FIG. 2 and FIG. 3, and thus is not discussed herein.

Although embodiments of the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. For instance, while the described embodiments might particularly advantageous for a battery powered device, the invention is not so limited and may provide advantageous features for a device coupled to an AC power source or other power source as well. Accordingly, the appended claims are intended to include within their scope such processes, machines, manufacture, compositions of matter, means, methods, or steps.

What is claimed is:

1. An apparatus comprising:
   a static logic block configured to receive a clock signal and a clock enable signal; and
   a domino logic block configured to receive the clock signal and a control signal from an output of the static logic block, wherein:
   an output of the domino logic block generates a signal similar to the clock signal in phase when the clock enable signal has a logic high state; and
   the output of the domino logic block generates a logic low signal when the clock enable signal has a logic low state.

2. The apparatus of claim 1, wherein the static logic block comprises:
   a delay generator configured to receive the clock signal;
   a first logic gate configured to receive the clock enable signal and a test enable signal; and
   a second logic gate having a first input coupled to an output of the delay generator and a second input coupled to an output of the first logic gate.

3. The apparatus of claim 2, wherein
   the first logic gate is a NOR gate; and
   the second logic gate is a NOR gate.

4. The apparatus of claim 2, wherein the test enable signal is configured such that:

the static logic block and the domino logic block perform a scan test when the test enable signal has a logic high state; and
the static logic block and the domino logic block operate in a normal mode when the test enable signal has a logic low state.

5. The apparatus of claim 2, wherein the delay generator comprises:
   a first inverter configured to receive the clock signal; and
   a second inverter having an input coupled to an output of the first inverter and an output coupled to the first input of the second logic gate.

6. The apparatus of claim 1, wherein the static logic block and the domino logic block are configured such that:
   an output of the domino logic block generates a signal similar to the clock signal in phase when the clock enable signal has a logic high state; and
   the output of the domino logic block generates a logic low signal when the clock enable signal has a logic low state.

7. The apparatus of claim 1, wherein the domino logic block comprises:
   an input stage having an input coupled to the clock signal;
   an inverter having an input coupled to an output of the input stage; and
   a full keeper block having an input and an output coupled to the output of the input stage.

8. The apparatus of claim 7, wherein the full keeper block comprises:
   a first inverter having an input coupled to the output of the input stage; and
   a second inverter having an input coupled to an output of the first inverter and an output coupled to the output of the input stage.

9. The apparatus of claim 7, wherein the input stage comprises:
   a first p-type metal oxide semiconductor (PMOS) transistor having a source coupled to a voltage potential;
   a first n-type metal oxide semiconductor (NMOS) transistor having a drain coupled to a drain of the first PMOS transistor, a gate coupled to a gate of the first PMOS transistor and further coupled to the clock signal; and
   a second NMOS transistor having a source coupled to ground, a drain coupled to a source of the first NMOS transistor and a gate coupled to the output of the static logic block.

10. A system comprising:
    an internal clock gating apparatus comprising:
       a static logic block configured to receive a clock signal and a clock enable signal; and
       a domino logic block configured to receive the clock signal and a control signal from an output of the static logic block, wherein:
       an output of the domino logic block generates a signal similar to the clock signal in phase when the clock enable signal has a logic high state, and
       the output of the domino logic block generates a logic low signal when the clock enable signal has a logic low state; and
    a plurality of circuits having a clock input coupled to an output of the internal clock gating apparatus.

11. The system of claim 10, wherein the internal clock gating apparatus is configured such that:
    the output of the internal clock gating apparatus generates a signal similar to the clock signal in phase when the clock enable signal has a logic high state; and the output of the internal clock gating apparatus generates a logic low signal when the clock enable signal has a logic low state.

12. The system of claim 10, wherein the internal clock gating apparatus is configured such that:
the output of the internal clock gating apparatus generates a signal similar to the clock signal in phase when the plurality of circuits are active; and
the output of the internal clock gating apparatus generates a logic low signal when the plurality of circuits are inactive.

13. The system of claim 10, wherein the static logic block comprises:
a delay generator configured to receive the clock signal;
a first logic gate configured to receive the clock enable signal and a test enable signal; and
a second logic gate having a first input coupled to an output of the delay generator and a second input coupled to an output of the first logic gate.

14. The system of claim 13, wherein the first logic gate is a NOR gate and the second logic gate is a NOR gate.

15. The system of claim 13, wherein at least one of the first logic gate and the second logic gate comprises:
a first inverter having an input configured to receive the clock enable signal;
a second inverter having an input configured to receive the test enable signal; and
an AND gate having a first input coupled to an output of the first inverter and a second input coupled to an output of the second inverter.

16. The system of claim 10, wherein the domino logic block comprises:
an input stage having an input configured to receive the clock signal;
an inverter having an input coupled to an output of the input stage; and
a full keeper block having an input and an output coupled to the output of the input stage.

17. The system of claim 16, wherein the full keeper block comprises:
a first inverter having an input coupled to the output of the input stage;
a first p-type metal oxide semiconductor (PMOS) transistor having a source coupled to a voltage potential, a gate coupled to an output of the first inverter, a drain coupled to the input of the first inverter;
a first n-type metal oxide semiconductor (NMOS) transistor having a drain coupled to the input of the first inverter, a gate coupled to the clock signal; and
a second NMOS transistor having a drain coupled to a source of the first NMOS transistor, a gate coupled to the output of the first inverter and a source coupled to ground.

18. The system of claim 16, wherein the full keeper block comprises:
a first inverter having an input coupled to the output of the input stage;
a first PMOS transistor having a source coupled to a voltage potential, a gate coupled to an output of the first inverter,
a second PMOS transistor having a source coupled to a drain of the first PMOS transistor, a gate coupled to an inverted signal of the clock signal, a drain coupled to the input of the first inverter;
a first NMOS transistor having a drain coupled to the input of the first inverter, a gate coupled to the clock signal; and
a second NMOS transistor having a drain coupled to a source of the first NMOS transistor, a gate coupled to the output of the first inverter and a source coupled to ground.

19. A circuit comprising:
a static logic block configured to receive a clock signal and a clock enable signal; and
a domino logic block configured to receive the clock signal and a control signal from an output of the static logic block, wherein
an output of the domino logic block generates a signal similar to the clock signal in phase when the clock enable signal has a logic high state, and
the output of the domino logic block generates a logic low signal when the clock enable signal has a logic low state.

20. The circuit of claim 19, wherein the domino logic block comprises:
an input stage comprising a first p-type metal oxide semiconductor (PMOS) transistor, a first n-type metal oxide semiconductor (NMOS) transistor and a second NMOS transistor connected in series;
an inverter having an input coupled to an output of the input stage; and
a full keeper block comprising:
a first inverter having an input coupled the output of the input stage;
a second PMOS transistor having a source coupled to a voltage potential, a gate coupled to an output of the first inverter,
a third PMOS transistor having a source coupled to a drain of the first PMOS transistor, a gate coupled to an inverted signal of the clock signal, a drain coupled to the input of the first inverter; and
a third NMOS transistor having a drain coupled to a source of the first NMOS transistor, a gate coupled to the output of the first inverter and a source coupled to ground.

21. The circuit of claim 19, wherein the static logic block comprises:
a delay generator configured to receive the clock signal;
a first logic circuit configured to perform a logic NOR function having a first input receiving the clock enable signal and a second input receiving a test enable signal; and
a second logic circuit configured to perform the logic NOR function having a first input coupled to an output of the delay generator and a second input coupled to an output of the first logic circuit.

* * * * *